United States Patent
Uchida (10) Patent No.: US 8,672,664 B2
(45) Date of Patent: Mar. 18, 2014

(54) APPARATUS FOR MOLDING COOKED RICE

(75) Inventor: Junya Uchida, Machida (JP)

(73) Assignee: Kabushiki Kaisha Audio-Technica, Machida-shi (JP)

( * ) Notice: Subject to any disclaimer, the term of this patent is extended or adjusted under 35 U.S.C. 154(b) by 988 days.

(21) Appl. No.: 12/588,899

(22) Filed: Nov. 2, 2009

(65) Prior Publication Data

US 2010/0221401 A1  Sep. 2, 2010

(30) Foreign Application Priority Data

Nov. 21, 2008  (JP) .................................. 2008-297688

(51) Int. Cl.
  *A21C 3/02*   (2006.01)
  *A21C 9/08*   (2006.01)
  *A21C 11/08*  (2006.01)
  *A23P 1/10*   (2006.01)

(52) U.S. Cl.
  USPC ..... 425/403.1; 425/237; 425/315; 425/324.1; 425/335; 425/397; 426/512; 426/518

(58) Field of Classification Search
  USPC .............. 425/237, 307, 308, 315, 324.1, 328, 425/383, 390, 403, 403.1, 406, 408, 436 R, 425/112, 125, 126.1, 297, 298, 310, 377, 425/394, 395, 397, 335, 337; 426/512, 518
  See application file for complete search history.

(56) References Cited

U.S. PATENT DOCUMENTS

| | | | | |
|---|---|---|---|---|
| 2,208,905 | A | * | 7/1940 | Kremmling et al. .......... 425/220 |
| 2,595,865 | A | * | 5/1952 | Lunsford ...................... 425/237 |
| 3,603,270 | A | * | 9/1971 | Tangel .......................... 99/450.6 |
| 3,834,851 | A | * | 9/1974 | Sinnema ...................... 425/261 |
| 3,887,315 | A | * | 6/1975 | Phillips, Jr. .................... 425/209 |
| 3,932,089 | A | * | 1/1976 | Ando ............................ 425/294 |
| 3,946,656 | A | * | 3/1976 | Hai .............................. 99/450.6 |
| 4,211,492 | A | * | 7/1980 | Konig et al. ................. 366/76.5 |
| 4,276,317 | A | * | 6/1981 | Hayashi ....................... 426/501 |
| 4,348,166 | A | * | 9/1982 | Fowler ......................... 425/310 |
| 4,381,906 | A | * | 5/1983 | Mancini ....................... 425/106 |
| 4,439,124 | A | * | 3/1984 | Watanabe ..................... 425/112 |
| 4,460,611 | A | * | 7/1984 | Suzuki ......................... 426/272 |
| 4,498,635 | A | * | 2/1985 | Fielding ........................ 241/94 |
| 4,548,571 | A | * | 10/1985 | Suzuki .......................... 425/297 |

(Continued)

FOREIGN PATENT DOCUMENTS

| | | | | |
|---|---|---|---|---|
| JP | 61177952 | A | * 8/1986 | ............... A23L 1/10 |
| JP | 61202665 | A | * 9/1986 | ............... A23L 1/10 |

(Continued)

*Primary Examiner* — Seyed Masoud Malekzadeh
(74) *Attorney, Agent, or Firm* — Manabu Kanesaka (57) ABSTRACT

Provided is a food molding apparatus which performs all steps from forming to conveyance and storage in one housing and which is small in size and inexpensive. A conveyance section 500 which holds a formed cooked rice product (a rice ball 10) by use of holding arms 510 is provided, within a housing, with an X-axis moving unit 570 which moves the formed cooked rice product in an X-axis direction and a Z-axis moving unit 550 which moves the formed cooked rice product in a Z-axis direction. A storage section 600 provided with a tray 610 on which the rice ball 10 is to be placed is further provided, within the housing, a Y-axis moving unit 630 which moves the tray 610 in a Y-axis direction, whereby the rice balls 10 are spread over on the tray 610.

11 Claims, 10 Drawing Sheets

(56) References Cited

U.S. PATENT DOCUMENTS

| | | | | |
|---|---|---|---|---|
| 4,552,523 A | * | 11/1985 | Suzuki | 425/225 |
| 4,597,731 A | * | 7/1986 | Suzuki | 425/204 |
| 4,637,304 A | * | 1/1987 | Suzuki | 99/450.2 |
| 4,798,529 A | * | 1/1989 | Klinner | 425/289 |
| 5,200,203 A | * | 4/1993 | Hayashi | 425/142 |
| 5,381,728 A | * | 1/1995 | Tateno | 99/450.1 |
| 5,576,033 A | * | 11/1996 | Herrera | 425/217 |
| 5,788,997 A | * | 8/1998 | Muller | 425/145 |
| 5,832,813 A | * | 11/1998 | Shimazu | 99/450.2 |
| 6,045,840 A | * | 4/2000 | Morikawa et al. | 426/231 |
| 6,065,392 A | * | 5/2000 | Florindez | 99/353 |
| 6,126,431 A | * | 10/2000 | Hayashi | 425/363 |
| 6,155,814 A | * | 12/2000 | Hayashi | 425/363 |
| 6,171,629 B1 | * | 1/2001 | Morikawa | 426/502 |
| 6,231,332 B1 | * | 5/2001 | Suzuki | 425/364 R |
| 6,244,169 B1 | * | 6/2001 | Shimazu | 99/450.2 |
| 6,263,788 B1 | * | 7/2001 | Chiang | 99/450.2 |
| 6,280,173 B1 | * | 8/2001 | Suzuki | 425/364 R |
| 6,322,345 B1 | * | 11/2001 | Zaltron | 425/363 |
| 6,352,020 B2 | * | 3/2002 | Uchida et al. | 99/450.6 |
| 6,361,307 B1 | * | 3/2002 | Bernhard et al. | 425/193 |
| 6,524,090 B1 | * | 2/2003 | Hayashi et al. | 425/140 |
| 6,685,457 B2 | * | 2/2004 | Hayashi et al. | 425/140 |
| 7,182,588 B2 | * | 2/2007 | Lambauer et al. | 425/101 |
| RE41,573 E | * | 8/2010 | Sanchez et al. | 426/496 |
| 8,066,154 B2 | * | 11/2011 | Schmidt | 222/272 |
| 2003/0039714 A1 | * | 2/2003 | Chiang | 425/363 |

FOREIGN PATENT DOCUMENTS

| | | | | |
|---|---|---|---|---|
| JP | 11-56275 | * | 3/1999 | A23L 1/10 |
| JP | H11-056275 | | 3/1999 | |
| JP | 2001-262169 | | 9/2001 | |
| JP | 2002-209539 | | 7/2002 | |
| JP | 2002-219679 | | 8/2002 | |
| JP | 2004-135651 | | 5/2004 | |
| JP | 2005-261379 | | 9/2005 | |
| JP | 2006197823 | * | 8/2006 | A23L 1/10 |

* cited by examiner

APPARATUS FOR MOLDING COOKED RICE

CROSS-REFERENCE TO RELATED APPLICATION

The present application is based on, and claims priority from, Japanese Application Ser. No. JP2008-297688, filed Nov. 21, 2008, the disclosure of which is hereby incorporated by reference herein in its entirety.

TECHNICAL FIELD

The present invention relates to a cooked rice molding apparatus which automatically produces formed cooked rice products, such as rice balls for sushi, and more particularly to a molding technique for performing all steps from forming to conveyance in one housing and for performing the steps without deforming shapes of formed products and a technique for miniaturizing the molding apparatus.

BACKGROUND ART

In food retail shops and sushi-go-round restaurants, dedicated cooked rice molding apparatus are used as devices which mass produce rice balls for hand-rolled sushi. For example, as described in Japanese Patent Application Publication No. 2006-197823, a cooked rice molding apparatus is provided with a compression section which delivers cooked rice supplied from a hopper while compressing the cooked rice and a forming section which forms the cooked rice delivered from the compression section into prescribed formed cooked rice products.

The forming section has a pair of forming rollers which rotate in directions opposite to each other around a prescribed horizontal rotary axis, feeds sushi rice from the upstream side to between the forming rollers and compressing the cooked rice with concave molding surfaces formed on outer surfaces of the forming rollers, whereby cylindrical rice balls are released from the downstream side and fall onto a table.

In small-scale shops, rice balls which have fallen onto the table are recovered by the worker. However, in a case where a large number of rice balls are continued to be produced for a long time, a dedicated food arrangement device which recovers the rice balls from the table and arranges the rice balls on trays is often built in the cooked rice molding apparatus.

For example, as described in Japanese Patent No. 3741836, this food arrangement device is of a type which is connected to a food molding apparatus in a crosswise adjacent position (a connected type). This food arrangement device grasps up the rice balls discharged from the food molding apparatus by use of an arm, causes the rice balls to move to a tray via X-Y axis moving means, and then places the rice balls on the tray by lowering the arm. According to this device, it is possible to arrange the formed rice balls in order onto the tray by causing the rice balls to be grasped by the arm.

In addition to this type, there is also a type in which a food molding apparatus and a food arrangement device are integrated together (an integrated type). In this type, rice balls are adapted to fall immediately from a forming section onto an X-Y moving stage provided in the lower part of the forming section, and the tray is moved in the X-Y direction each time a rice ball falls, whereby it is possible to spread the rice balls over the tray.

However, the above-described conventional examples had problems as described below. That is, in the case of the connected type, the installation space is separately provided for the food molding apparatus and the food arrangement device and it is necessary to have a large work space for the two units. Furthermore, because of the provision of the two units, a mechanism for synchronizing the operations of the two units becomes complex, resulting in high cost.

Furthermore, because of alternate actions due to the connection of the two units, during the delivery of formed products from the food molding apparatus to the food arrangement device, position shifts and catch mistakes are apt to occur during the gasping by the arm, and it was not rarely that the arm broke formed products due to catch mistakes.

In the case of the integrated type, it is necessary to move the tray seat provided on the lower side in the X-Y direction and, therefore, a space which is at least double the size of a conveyance tray in length and breadth becomes necessary. For this reason, the machine dimensions increase.

In a case where formed products are pushed out of a food molding apparatus onto a tray by use of a pushing-out rod and the like, the formed products may sometimes fall under their own weight before the retraction of the pushing-out rod and lose their shapes. Furthermore, this case has the problems that the pushing-out position shifts and that formed products roll on the tray.

Hence, the present invention has been made to solve the above-described problems and the object of the invention is to provide a food molding apparatus which can perform all steps from forming to conveyance and storage in one housing and which is small in size and inexpensive.

SUMMARY OF THE INVENTION

To achieve the above-described object, the present invention has some features as described below. In a cooked rice molding apparatus including a forming section which forms cooked rice, which is supplied from a hopper into a housing, into a prescribed formed cooked rice product, a conveyance section which conveys the formed cooked rice product from the forming section to a prescribed position, and a storage section which stores the formed cooked rice product conveyed by the conveyance section, the conveyance section is provided with X-axis moving means which moves the formed cooked rice product in an X-axis direction within the housing and Z-axis moving means which moves the formed cooked rice product in a Z-axis direction within the housing, and the storage section is provided with a tray capable of moving in a Y-axis direction within the housing and Y-axis moving means thereof; the X-axis direction being the width direction of the housing, the Z-axis direction being the vertical direction thereof, and the Y-axis direction being the depth direction thereof.

According to this feature, because the conveyance section is provided with X-axis moving means which moves the formed cooked rice product in the X-axis direction and Z-axis moving means which moves the formed cooked rice product in the Z-axis direction and the storage section is provided with Y-axis moving means which moves a tray on which the formed cooked rice product is to be placed in the Y-axis direction, the cooked rice forming section and the conveyance section are integrated together and hence it is possible to install the cooked rice molding apparatus in a small work space.

As a more preferred aspect, the forming section has a pair of forming rollers which rotate in directions opposite to each other around a prescribed horizontal rotary axis, a concave molding surface for forming the formed cooked rice product is provided on an outer circumferential surface of each of the forming rollers, and the cooled rice fed from an upstream side of opposed surfaces of each of the forming rollers is formed with the concave molding surfaces and is discharged from a downstream side of the opposed surfaces of the forming roller. In this cooked rice molding apparatus, the conveyance section has a pair of holding arms which hold the formed cooked rice product in a sandwiching manner, and each of the holding arms is formed in the shape of the letter V which is such that the distance between the opposed holding arms decreases from an upper end side to a lower end side in order to catch the formed cooked rice product caused to fall from a downstream side of the forming section.

According to this feature, it is possible to form cooked rice into a prescribed shape without giving unnecessary stress to the cooked rice and it is possible to cause the formed cooked rice product which has been formed to fall positively between the holding arms and to catch the formed cooked rice product with leading ends of the holding arms.

A claw portion which holds the formed cooked rice product from a bottom surface thereof to a side surface thereof is provided on an opening and closing end side of each of the holding arms and the claw portions are arranged to be opposed to each other, whereby a space in which the formed cooked rice product is housed is formed between the claw portions.

According to this feature, a claw portion having an L-shaped section which holds the formed cooked rice product from a bottom surface thereof to a side surface thereof is provided on a leading end side of each of the holding arms and the claw portions are arranged to be opposed to each other, whereby a space in which the formed cooked rice product is housed is formed between the claw portions. As a result, it is possible to prevent formed cooked rice products which have fallen from collapsing and being deformed by collision.

Furthermore, a surface of the claw portion opposed to the formed cooked rice product is provided with displacement prevention means for preventing the formed cooked rice product from shifting upward due to a pressing force during the pressing of the formed cooked rice product against the tray.

According to this feature, because a surface of the claw portion opposed to the formed cooked rice product is provided with displacement prevention means for preventing the formed cooked rice product from shifting upward due to a pressing force during the pressing of the formed cooked rice product against a surface of the storage section where the formed cooked rice product is placed, it is possible to flatten the bottom surface of the formed cooked rice product by pressing the bottom surface of the formed cooked rice product against the surface of the storage section where the formed cooked rice product is placed and it is possible to stably place the formed cooked rice product on this surface.

As another aspect, the displacement prevention means is formed in the shape of saw teeth having a gentle obtuse surface in a falling direction of the formed cooked rice product and an acute surface in a counter falling direction of the formed cooked rice product.

According to this feature, because the displacement prevention means is formed in the shape of saw teeth having a gentle obtuse surface in a falling direction of the formed cooked rice product and an acute surface in a counter falling direction of the formed cooked rice product, it is possible to prevent the formed cooked rice product from collapsing by collision during a fall and to positively prevent the formed cooked rice product from being lifted up during depressing.

The conveyance section is further provided with arm opening and closing means which releases the formed cooked rice product held by the holding arms in a sandwiching manner by opening and closing a leading end of each of the holding arms, and pushing-out means which pushes out cooked rice housed in the holding arm to the storage section.

According to this feature, because the conveyance section is further provided with arm opening and closing means which releases the formed cooked rice product held by the holding arms in a sandwiching manner by opening and closing a leading end of each of the holding arms, and pushing-out means which pushes out cooked rice housed in the holding arm to the storage section, it is possible to more positively prevent the formed cooked rice product from moving or losing its shape in association with the opening and closing the arms.

Furthermore, the pushing-out means includes a depressing lever which maintains the posture of the formed cooked rice product by depressing an upper surface of the formed cooked rice product during the release of the formed cooked rice product, and the depressing lever is provided with spring means which makes a depressing force of the formed cooked rice product constant.

According to this feature, because the conveyance section is further provided with arm opening and closing means which releases the formed cooked rice product held by the holding arms in a sandwiching manner by opening and closing a leading end of each of the holding arms, and pushing-out means which pushes out cooked rice housed in the holding arm to the storage section, it is possible to more positively prevent the formed cooked rice product from moving or losing its shape in association with the opening and closing the arms.

A control method of this cooked rice molding apparatus is also included in the present invention. That is, a method is provided for controlling a cooked rice molding apparatus including a forming section which forms cooked rice, which is supplied from a hopper into a housing, into a prescribed formed cooked rice product, a conveyance section which conveys the formed cooked rice product from the forming section to a prescribed position, and a storage section which stores the formed cooked rice product conveyed by the conveyance section. In this method for controlling a cooked rice molding apparatus, the forming section has a pair of forming rollers which rotate in directions opposite to each other around a prescribed horizontal rotary axis, and a concave molding surface for forming the formed cooked rice product is provided on an outer peripheral surface of each of the forming rollers. In this method for controlling a cooked rice molding apparatus, the conveyance section is provided with X-axis moving means which moves the formed cooked rice product in an X-axis direction within the housing and Z-axis moving means which moves the formed cooked rice product in a Z-axis direction within the housing; the width direction of the housing being the X-axis direction, the vertical direction thereof being the Z-axis direction, and the depth direction thereof being the Y-axis direction. In this method for controlling a cooked rice molding apparatus, the conveyance section has a pair of holding arms which hold the formed cooked rice product in a sandwiching manner, arm opening and closing means which releases the formed cooked rice product held by the holding arms in a sandwiching manner by opening and closing a leading end of each of the holding arms, and pushing-out means which pushes out cooked rice housed in the holding arm to the storage section. In this method for controlling a cooked rice molding apparatus, the storage section has a tray capable of moving in a Y-axis direction within the housing and Y-axis moving means thereof and further includes control means which controls at least the compression section, the forming section, the conveyance section and the storage section. In this method for controlling a cooked rice molding apparatus, the control means compression-forms the cooked rice fed from an upstream side of opposed surfaces of each of the forming rollers with the concave molding surface, discharges the cooked rice from a downstream side of the opposed surfaces of the forming roller, introduces the formed cooked rice product caused to fall from the downstream side of the forming section from an upstream side between the holding arms and holds the formed cooked rice product in a sandwiching manner on the opening and closing end side of the holding arms, thereafter moves the holding arms to a prescribed position of the tray by use of the X-axis moving means and moves the formed cooked rice product onto a surface where the tray is placed by use of the Z-axis moving means, depresses an upper surface of the formed cooked rice product by use of the depressing means, and opens the opening and closing end of the holding arm while pressing a bottom surface of the formed cooked rice product against the tray by use of the arm opening and closing means, thereby releasing the formed cooked rice product onto the tray.

According to this feature, the pushing-out means includes a depressing lever which maintains the posture of the formed cooked rice product by depressing an upper surface of the formed cooked rice product during the release of the formed cooked rice product, and the depressing lever is provided with spring means which makes a depressing force of the formed cooked rice product constant, it is possible to prevent the formed cooked rice product from losing its shape due to the depressing force of the depressing lever.

DETAILED DESCRIPTION

An embodiment of the present invention will be described below with reference to the accompanying drawings. However, the present invention is not limited to this embodiment. As shown in FIGS. 1 to 4, this cooked rice molding apparatus 100 is provided with a hopper 200 into which cooked rice (sushi rice) is charged, a compression section 300 which delivers the sushi rice supplied from the hopper 200 while compressing the sushi rice, a forming section 400 which forms the compressed sushi rice into a prescribed shape, a conveyance section 500 which conveys the formed cooked rice product (rice ball 10, see FIG. 4) to a prescribed place, and a storage section 600 which temporarily stores the rice ball 10 conveyed from the conveyance section 500.

Figure 3:
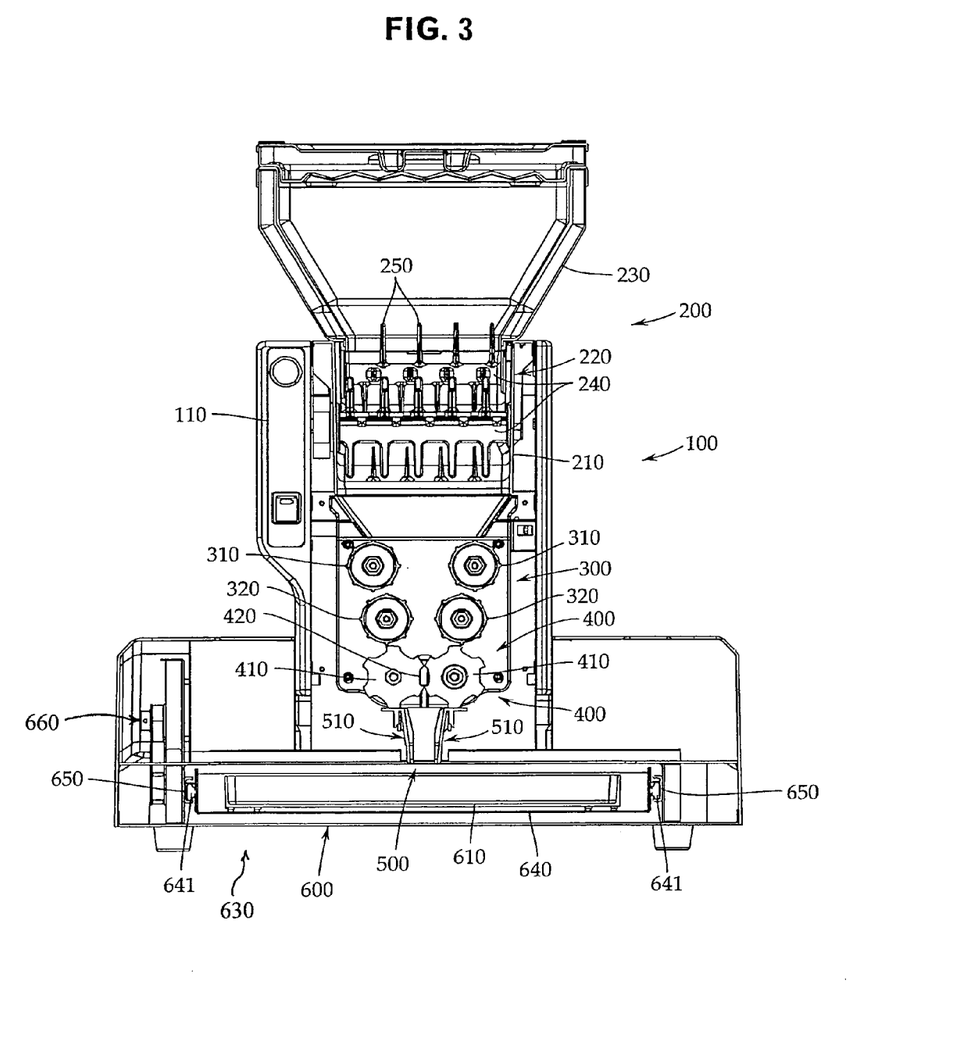
FIG. 3 is a front view showing the internal construction of a food molding apparatus of the present invention.

Incidentally, in this embodiment, the X-axis direction indicates the width direction of the cooked rice molding apparatus 100 (the horizontal direction of FIG. 3), and the Y-direction indicates the depth direction of the cooked rice molding apparatus 100 (the vertical direction of the paper of FIG. 3). The Z-axis direction indicates the vertical direction of the cooked rice molding apparatus 100 (the vertical direction of FIG. 3).

Figure 1:
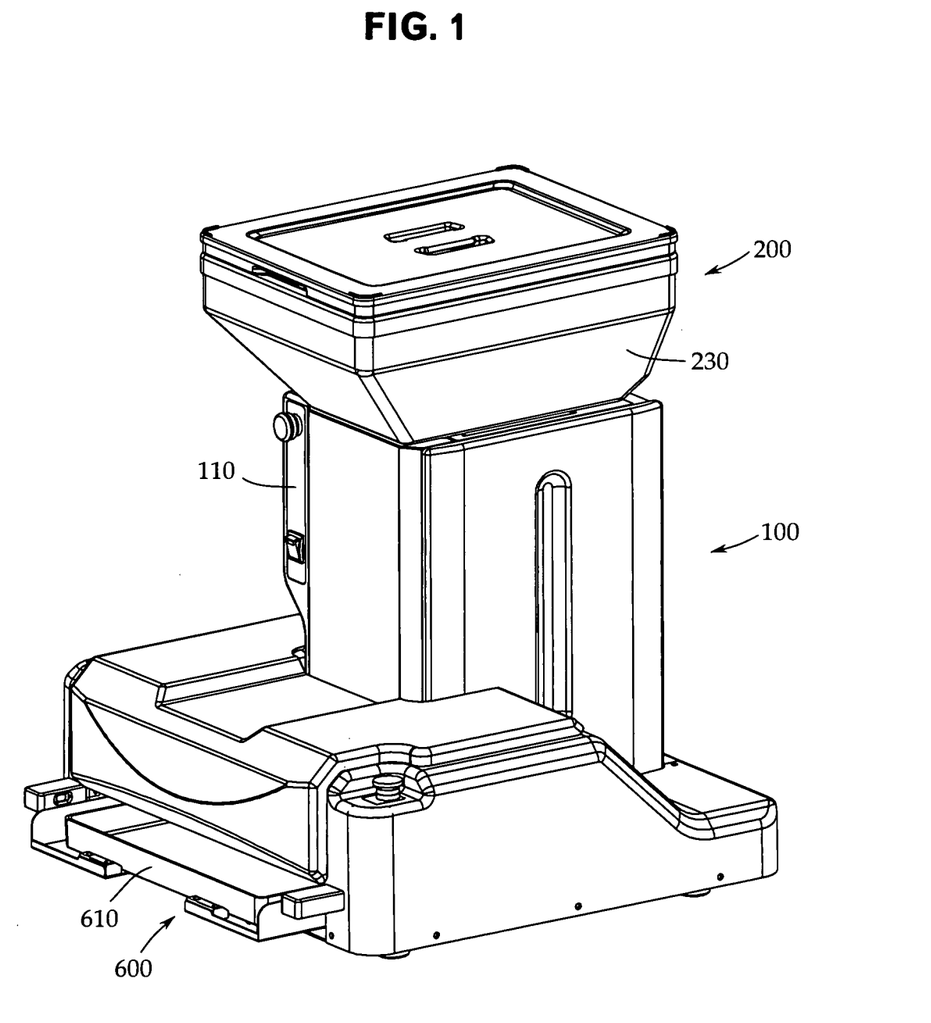
FIG. 1 is a perspective view of a cooked rice molding apparatus in an embodiment of the present invention.
Figure 2:
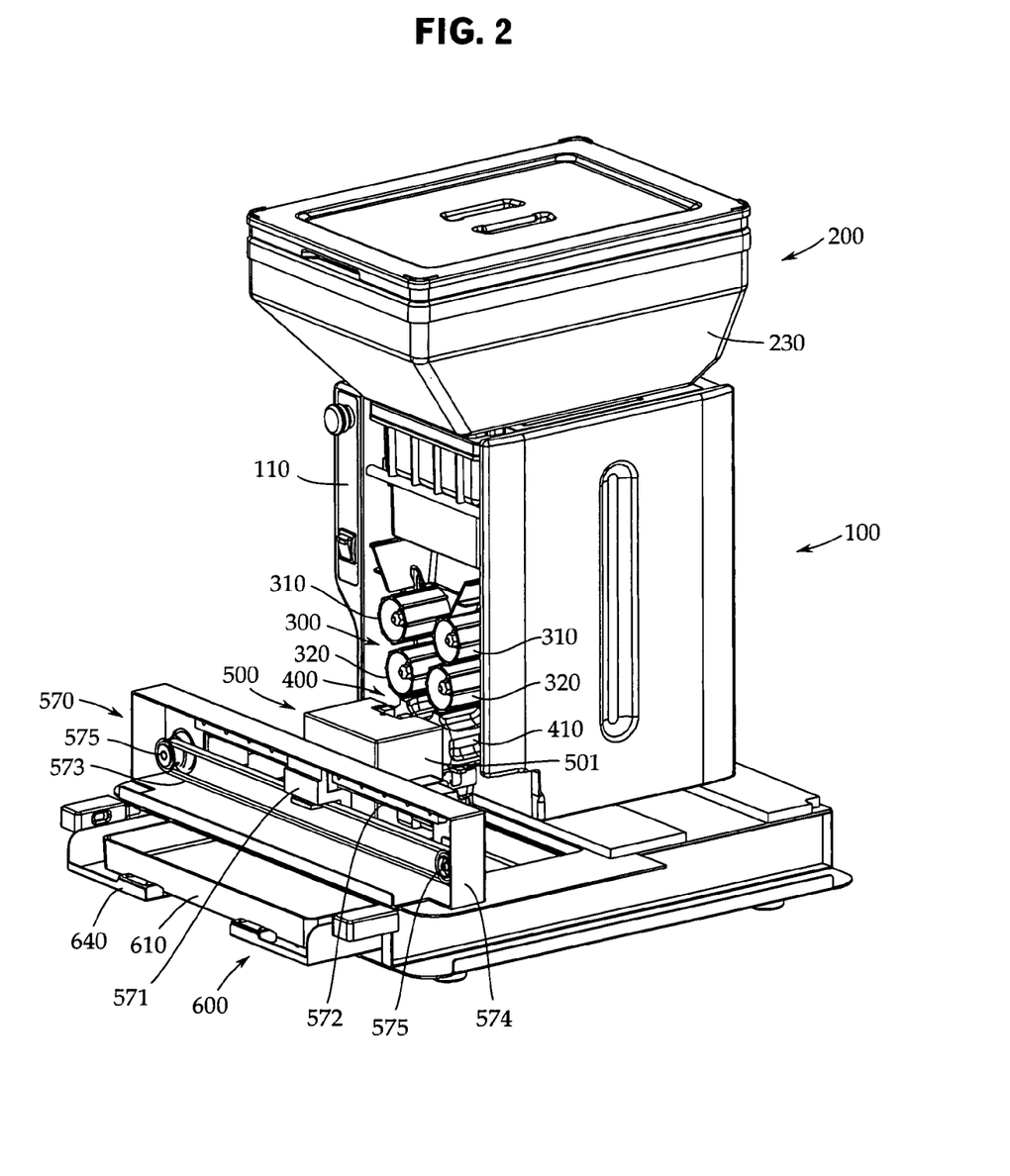
FIG. 2 is a perspective view of the food molding apparatus of FIG. 1 whose cover is removed so that the internal construction can be seen.

As shown in FIG. 1, in ordinary usage, the cooked rice molding apparatus 100 is covered with panels to prevent the entry of dust and these panels are capable of being detached during maintenance, whereby an internal construction as shown in FIG. 2 appears.

On the front surface of the cooked rice molding apparatus 100, there is provided a control panel 110 for operating the cooked rice molding apparatus 100. In this embodiment, the control panel 110 is provided on the upper left-hand part of the front surface and there are arranged various kinds of setting buttons for setting the amount of sushi rice, the number of rice balls 10 to be formed, etc. and a display section as well as a power switch, an emergency stop switch and the like. In the present invention, the configuration of the control panel 110 can be optionally set in accordance with specifications.

The hopper 200 is open toward the upper part of the apparatus main body and is provided with a retaining section 210 in which sushi rice is retained and a stirring section 220 which causes sushi rice to flow forcedly to the downstream side while stirring the sushi rice, and a storage container 230 which supplies sushi rice to the hopper 200 is detachably provided in the upper part of the cooked rice molding apparatus 1.

Figure 4:
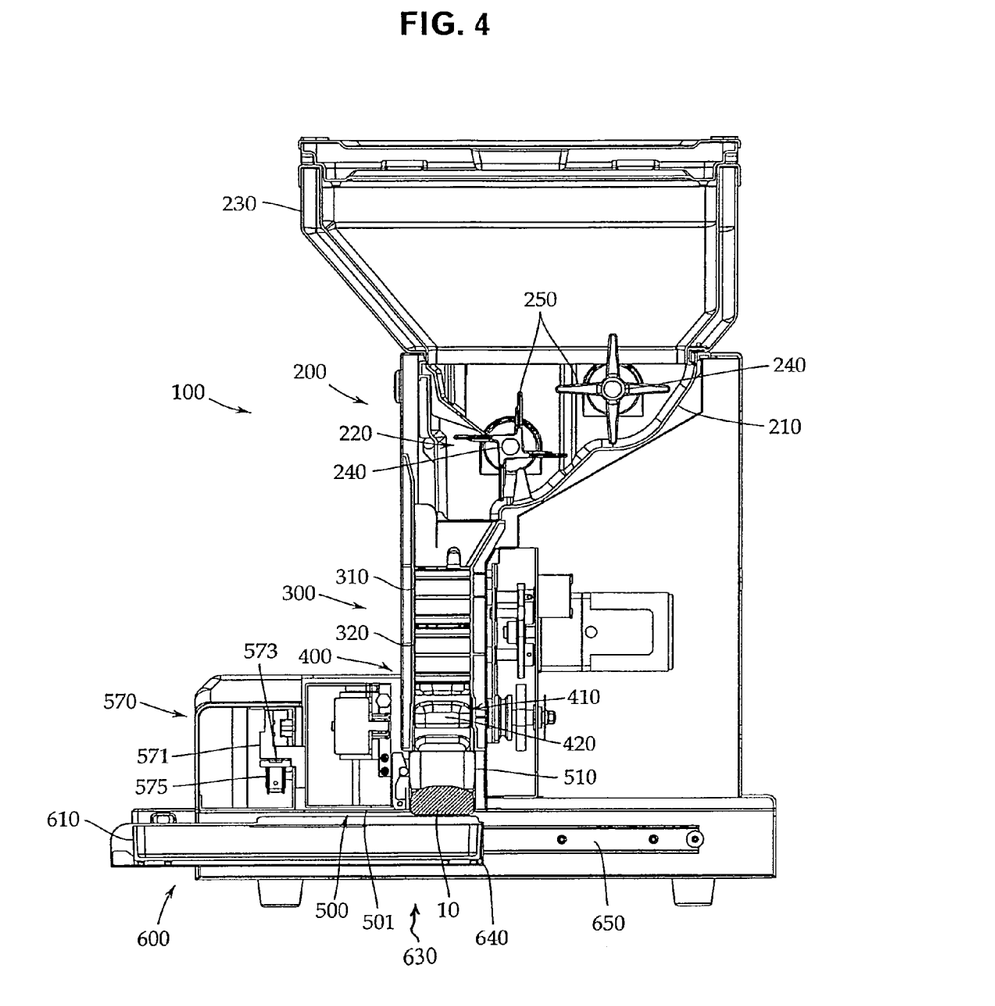
FIG. 4 is a side view showing the internal construction of the food molding apparatus of the present invention.

The retaining section 210 is formed in the shape of a funnel whose volume decreases from the upper to the lower part of the apparatus main body, and the downstream side thereof opens toward a rolling section 300, which will be described later. The stirring section 220 has two stirring arms 240 which are rotatably driven by unshown driving means, and a plurality of stirring rods 250 are attached to each of the stirring arms 240 at prescribed intervals. In FIG. 4, each of the stirring arms 240 rotates rightward (clockwise).

The compression section 300 is a two-high compression section having an upper compression roller pair 310 which is arranged on the outlet side of the hopper 200 and compresses sushi rice supplied from the hopper 200 and a lower compression roller pair 320 which is arranged on the downstream side (delivery side) of the upper compression roller pair 310 and further compresses the sushi rice compressed by the upper compression roller pair 310.

The upper compression roller pair 310 consists of a pair of rollers which rotate around a prescribed horizontal rotary axis (in the vertical direction of the paper in FIG. 3), and the rollers are arranged to be opposed to each other at a prescribed interval. Also the lower compression roller pair 320 consists of a pair of rollers which similarly rotate around a prescribed horizontal rotary axis, and the rollers are arranged to provide a narrower interval than in the upper compression roller pair 310.

Both the upper compression roller pair 310 and the lower compression roller pair 320 are set so as to rotate in directions opposite to each other in order to move sushi rice caused to flow forcedly between opposed rollers from the upstream side to the downstream side.

In this embodiment, the compression section 300 consists of two-high compression rollers. However, depending on specifications, the compression section 300 may consist of one-high compression rollers or may be of a multiple-high type. In the present invention, a concrete configuration of the hopper 200 and the compression section 300 is optional and the shape, arrangement and the like thereof may be capable of being optionally changed in accordance with specifications.

The forming section 400 is provided with a pair of forming rollers 410, 410 arranged on the downstream side of the compression section 300. The forming rollers 410, 410 have the same shape, are made of synthetic resin, and are designed to rotate synchronously in directions opposite to each other.

On an outer surface of the forming roller 410, there is provided a concave molding surface 420 which forms the sushi rice fed into the forming section 400 into the rice ball 10. The concave molding surface 420 is formed from a semi-cylindrical concavity having a volume corresponding to substantially half the rice ball 10 from the outer surface to the center of the forming roller 410, and the concave molding surface 420 is provided at prescribed intervals in the circumferential direction of the forming roller 410, in this embodiment, in six places at intervals of 60 degrees.

The forming rollers 410 are arranged in such a manner that the concave molding surfaces 420 are opposed to each other. With this arrangement, the sushi rice caused to flow forcedly between the forming rollers 410 from the upstream side is filled into the concave molding surfaces 420, 420, compressed by the rotation of the forming rollers 410, formed into a cylinder, and then discharged to the downstream side.

In this embodiment, the forming section 400 causes the pair of forming rollers 410, 410 to rotate while bringing the forming rollers 410, 410 into contact with each other, thereby forming sushi rice into the rice ball 10 by introducing the sushi rice between the forming rollers 410. However, the forming section 400 may also be of another type, such as a type in which sushi rice is squeezed into a forming cylinder and is compressed by use of a piston.

In the present invention, a concrete construction of the forming section 400 is optional, and the forming section 400 may be optionally changed in accordance with specifications so long as the forming section 400 is of such a construction that the rice ball 10 is caught by a conveyance section 500, which will be described later.

Figure 5:
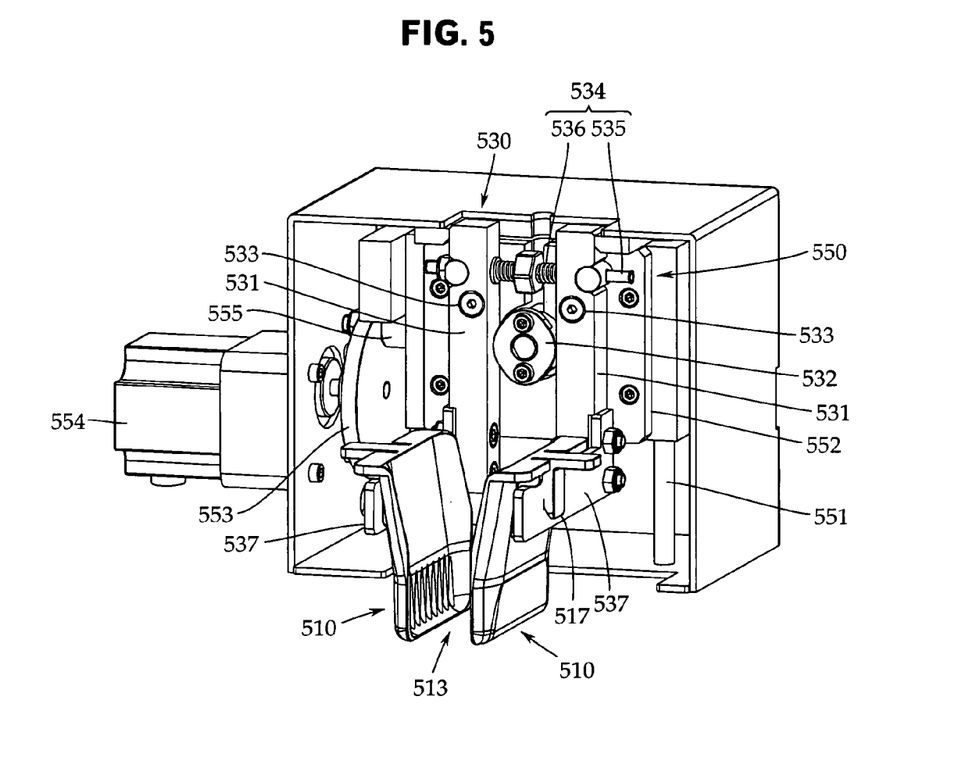
FIG. 5 is a perspective view showing the general construction of a conveyance section.
Figure 6:
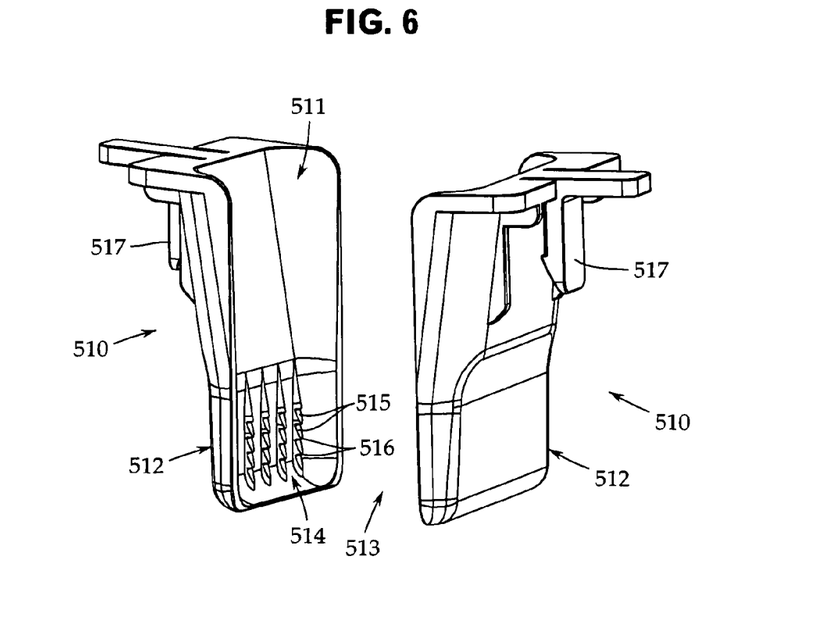
FIG. 6 is a perspective view of holding arms.
Figure 7:
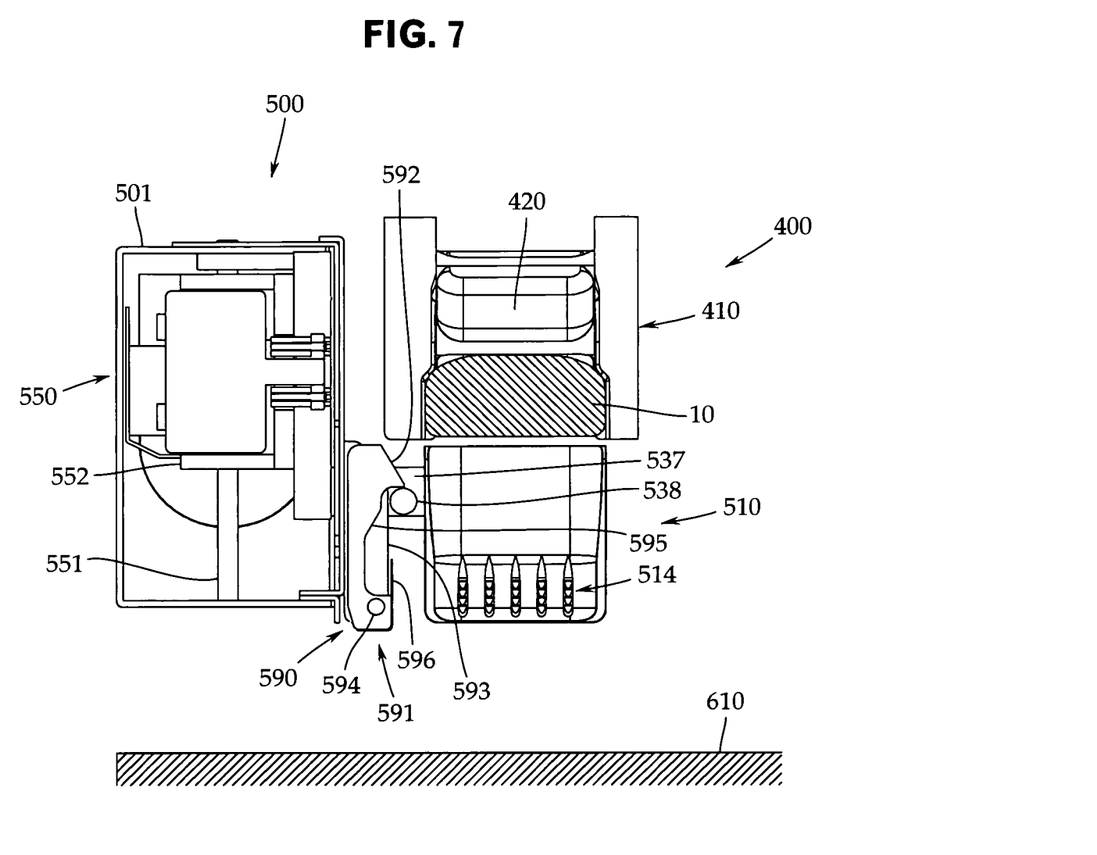
FIG. 7 is a schematic diagram of the conveyance section as viewed from the side surface.

Referring to FIGS. 5 to 7 additionally, the conveyance section 500 is further provided with a pair of holding arms 510, 510 which grasp the formed rice ball 10, arm opening and closing means 530 which opens and closes leading ends of the holding arms 510, 510, Z-axis moving means 550 which raises and lowers the holding arms 510, 510 in the vertical direction (Z-axis direction, the vertical direction in FIG. 3), X-axis moving means 570 which moves the holding arms 510, 510 in the horizontal direction (X-axis direction, the horizontal direction in FIG. 3), and pushing-out means 590 which pushes out the rice ball 10 held by the holding arm 510 into a storage section 600.

The conveyance section 500 is such that a housing cover 501 in which the holding arm 510, the arm opening and closing means 530 and the Z-axis moving means 570 are built is arranged on the downstream side of the forming section 400, and the whole protective cover 501 is adapted to be moved horizontally by the X-axis moving means 570.

Referring to FIG. 6 additionally, the holding arms 510, 510 are both moldings of synthetic resin of the same shape, and are arranged horizontally symmetrically. In the following, descriptions will be given by taking one of the holding arms 510, 510 as an example.

The holding arm 510 is provided with a trough-shaped guide surface 511 which guides the rice ball 10 from the upstream side to the downstream side. The guide surface 511 is such that an upper end thereof opens toward the forming section 400, and the guide surface 511 is formed from a tapered surface which inclines at a prescribed inclination angle from the upstream side to the downstream side. As a result of this, the distance between the opposed guide surfaces 511 decreases from the upper end side to the lower end side and a V-shaped (funnel-shaped) capture space is formed.

On the back surface (counter guide surface 511) side of the holding arm 510, there is provided a locking claw 517 by which the holding arm 510 is fixed to link arms 531, 531 of arm opening and closing means 530, which will be described later. In this embodiment, the holding arm 510 is elastically fixed to an attachment stay 537 at a leading end of the link arm 531 via the locking claw 517. However, the holding arm 510 may be fixed by use of a screw and the like.

On the leading end side of the holding arm 510, there is provided a claw portion 512 having an L-shaped section, which holds the rice ball 10 from a bottom surface of the rice ball 10 to a side surface thereof, and the claw portions 512 are arranged so as to be opposed to each other, whereby a holding space 513 in which the rice ball 10 is housed is formed between the claw portions 512.

On the surface of the claw portion 512 opposed to the rice ball 10, there is provided displacement prevention means 514 for preventing the rice ball 10 from shifting upward due to a pressing force when the rice ball 10 is pressed against a tray 610 of the storage section 600.

The displacement prevention means 514 is formed in the shape of saw teeth alternately having a gentle obtuse surface 515 in a falling direction of the rice ball 10 and an acute surface 516 in a counter falling direction of the rice ball 10.

In this embodiment, the displacement prevention means 514 is such that part of the claw portion 512 is formed in the shape of saw teeth and is caused to hitch and hold on part of the rice ball 10. However, other methods may be used so long as it is possible to restrict the lifting-up of the rice ball 10.

Again referring to FIG. 5, the arm opening and closing means 530 is provided with a pair of link arms 531, 531 attached to be rotatable around a prescribed horizontal rotary axis and a disk cam which causes the leading ends of the link arms 531, 531 to depart from each other.

The link arms 531, 531 are both formed from a bar-like body made of metal and is screwed to a Z-axis slide base 552 on which the Z-axis moving means 550 slides, which is provided on the back surface side of the housing cover 501 and which will be described later, via bolts 533, 533.

The link arms 531, 531 are attached so as to be rotatable around the shafts of the bolts 533, 533, and on the leading end side (the lower end in FIG. 5), the above-described holding arms 510, 510 are attached each in an opposed manner via the attachment stays 537, 537. In this embodiment, the bolts 533, 533 are attached near the upper end of the link arms 531, 531 and the leading ends (the lower ends in FIG. 5) are adapted to open and close in an inverted V-shaped manner.

At the upper ends of the link arms 531, 531, there is provided a spring mechanism 534 for spring-urging the leading ends of the link arms 531, 531 in a direction in which the leading ends of the link arms 531, 531 are caused to constantly approach each other. The spring mechanism 534 includes a shaft 534 which horizontally connects the sides of other ends of the link arms 531, 531, and a compression spring 536 which is coaxially inserted, with the shaft 534 serving as the center. Spring-urging is performed in a direction in which the upper end sides of the link arms 531, 531 are caused to constantly depart from each other, whereby the link arms 531,531 are spring-urged so that the leading end sides close constantly.

The disk cam 532 consists of an elliptic rotary cam connected to a rotary shaft of an unshown driving motor and is arranged between the link arms 531, 531 in such a manner that an outer circumferential surface of the disk cam 532 comes into sliding contact with the link arms 531, 531. The disk cam 532 is arranged in such a manner that a rotary axis thereof becomes lower than the rotary axes of the bolts 533,533.

With this arrangement, when the short-axis side of the disk cam 532 is opposed to the inner surfaces of the link arms 531, 531, the disk cam 532 does not interfere with the link arms 531, 531 and the leading ends of the link arms 531, 531 are constantly closed by the spring force.

The disk cam 532 is rotated from this state and the inner circumferential surfaces of the link arms 531, 531 are pushed up by the side surface on the long-axis side, whereby the link arms 531, 531 rotate around rotary axes and the leading ends open.

In this embodiment, the link arms 531, 531 are spring-urged via the spring mechanism 534 in a direction in which the leading ends close constantly, and the leading ends open and close as the disk cam 532 rotates. However, the opening and closing mechanism of the link arms 531, 531 may be optionally changed in accordance with specifications.

As shown in FIG. 5, the Z-axis moving means 550 is provided with a pair of guide shafts 551, 551 which are arranged parallel to each other along the vertical direction of the housing cover 501, a Z-axis slide base 552 which slides vertically along the guide shafts 551, 551, an ascent and descent cam 553 which causes the Z-axis slide base 552 to slide vertically, and a drive motor 554.

The guide shafts 551, 551 are each in the shape of a cylinder spanning the housing cover 501 from an upper surface thereof to a lower surface thereof, and the Z-axis slide base 552 is attached to the guide shafts 551, 551. The Z-axis slide base 552 is formed from a plate-like body arranged so as to straddle the guide shafts 551, 551, and the above-described arm opening and closing means 530 is mounted.

On the side surface of the Z-axis slide base 552 (the left side surface in FIG. 5), there is provided the ascent and descent cam 553 which causes the Z-axis slide base 552 to ascend and descend vertically. The ascent and descent cam 553 is such that a driving shaft of the drive motor 554 is coaxially attached to the center and an eccentric shaft 555 connected to the Z-axis slide base 552 is provided in a position eccentric from a central axis.

With this arrangement, the Z-axis slide base 552 performs vertical ascent and descent motions via the eccentric shaft 555 of the ascent and descent cam 553 by the rotation of the drive motor 554. In this embodiment, the Z-axis moving means 550 uses the disk cam to produce rotational-linear motions. However, other techniques may also be used.

Referring to FIG. 2, the X-axis moving means 570 is provided with an X-axis slide base 571 provided on the back surface side (the reverse surface side in FIG. 5) of the housing cover 501, a guide rail 572 which guides the X-axis slide base 571, and a driving belt 573 which moves the X-axis slide base 571 horizontally reciprocally along the guide rail 572.

The X-axis slide base 571 is attached to the back surface side of the housing cover 501, and a driving belt 573 is locked to part of the X-axis slide base 571. The guide rail 572 consists of an open groove formed along the back surface (the opposed surface against the housing cover 501) of a rail cover 574 in the shape of a rectangular parallelepiped, which is provided in the housing of the cooked rice molding apparatus 100, along the X-axis direction (the horizontal direction in FIG. 3), and the X-axis slide base 571 is slidably attached to the guide rail 572.

The rail cover 574 is provided with a pair of belt rollers 575, 575 which are rotated by an unshown drive motor, and a driving belt 573 is provided in a tensioned state in the belt rollers 575, 575.

With this arrangement, the housing cover 501 is adapted to move reciprocally in the X-axis direction via the X-axis slide base 571 attached to the driving belt 573 by causing the driving belt 573 to rotate reciprocally.

In this embodiment, the X-axis moving means 570 causes the housing cover 501 to slide reciprocally in the X-axis direction by causing the driving belt 573 to perform forward and reverse rotations. However, the housing cover 501 may be caused to slide by other methods.

Referring to FIG. 7, the depressing means 590 is provided with a depressing lever 591 whose free end rotates in association with the ascent and descent of the Z-axis slide base 552. The depressing lever 591 is formed from a molding of synthetic resin, and on the free end side (the upper end side in FIG. 7), there is provided a depressing surface 592 which depresses an upper surface of the rice ball 10.

The lower end side of the depressing lever 591 is attached to a supporting stay 593, which is attached to the front surface (the right side surface in FIG. 7) of the housing cover 501, so as to be rotatable around a rotary shaft 594. The depressing lever 591 is provided with a guide surface 595 which is guided by a guide rib 538 provided in the supporting stay 537.

The lower end of the depressing lever 591 is further provided with a plate spring 596 as spring means which makes the depressing force with which the depressing lever 591 depresses an upper surface of the rice ball 10 constant. The plate spring 596 is formed from a metal plate arranged along the front surface (the right side surface in FIG. 7) of the depressing lever 591, and the depressing force applied to the depressing surface 592 becomes constant by the hitching of part of the guide rib 537.

In this embodiment, the depressing lever 591 is adapted to perform rotational motions by following the ascent and descent motions of the Z-axis slide base 552. However, a dedicated driving mechanism and the like may be provided, and concrete configurations and the like may be optionally set in accordance with specifications.

Referring to FIGS. 2 to 4, the storage section 600 is provided with a tray 610 on which the rice ball 10 is temporarily stored and a Y-axis moving means 630 which moves the tray 610 in the Y-axis direction. The tray 610 is formed from a molding of synthetic resin and is a rectangular box body whose upper surface is open. The size and shape of the tray 610 may be optionally selected.

The Y-axis moving means 630 is provided with a stage 640 on which the tray 610 is placed, a pair of slide rails 650, 650 which support both side surfaces of the stage 640 so as to be slidable, and a slider 660 which causes the stage 640 to slide reciprocally.

The stage 640 is formed from a molding of a metal plate and has a size which enables at least the tray 610 to be placed thereon. The stage 640 is such that an upper surface thereof is open to place the tray 610 thereon, and the bottom is provided with an unshown concavity and the like, to prevent the position of the tray 610 from shifting.

Both side surfaces (the right and left surfaces in FIG. 3) of the stage 640 are provided with a bearing 641 which is slidably supported by the slide rails 650, 650. In this embodiment, the bearing 641 is provided at both ends of each side surface. The bearing 641 is provided in four right and left places in all.

The slide rails 650, 650 each consist of one rail made of metal which is formed to have a section in the shape of the letter U, and are arranged on the side surfaces at the bottom of the housing in positions symmetrical with each other so as to sandwich the stage 640. The bearing 641 is arranged so as to slide along an inner circumferential surface of each of the slide rails 650, 650.

The slider 660 is adapted to slide in the Y-axis direction by use of a rack and pinion mechanism which transmits the rotational driving force from the drive motor 661 to an unshown rack gear, which is provided in part of one side surface (the left side surface in FIG. 3) of the stage 640, via a pinion gear 662.

In this embodiment, the Y-axis moving means 630 uses a rack and pinion type slide mechanism. However, other mechanisms may also be adopted, and any method is optionally selected in accordance with specifications so long as it is a method for reciprocally moving the tray 610 on which the rice ball 10 is placed in the Y-axis direction.

Next, referring to FIGS. 1 to 11, a description will be given of an example of a procedure for using this cooked rice molding apparatus 100. First, after the storage container 230 in which sushi rice is charged is attached to an upper part of the hopper 200, the power switch is turned on. As a result of this switch operation, the stirring rod 240 of the hopper 200 starts rotating.

Next, after various items such as the amount of sushi rice and the number of rice balls 10 to be formed are set by operating the control panel 110, a work start button is operated. In response to the work start button, an unshown control section first performs the initialization of all mechanisms and makes checks as to whether no error signals have been outputted, whether the conveyance section 500 is in an initial position, and the like.

When the checking is completed, the control section causes each of the compression rollers 310, 320 of the compression section 300 to rotate, whereby the sushi rice delivered from the hopper 200 is conveyed to the upstream side of the forming section 400 while being compressed.

On ascertaining that the sushi rice has arrived at the upstream side of the forming section 400, the control section issues an instruction to the forming section 400, and causes the forming roller pairs 410, 410 of the forming section 400 to rotate in directions opposite to each other.

As the forming rollers 410, 410 rotate, the sushi rice is taken between the concave molding surfaces 420, 420 of the forming roller pairs 410, 410 and a rice ball 10 is formed. When the forming roller pairs 410, 410 further rotate, the formed rice ball 10 slips off from the concave molding surface 420 and is thrown down at the downstream conveyance section 500.

Figure 8A:
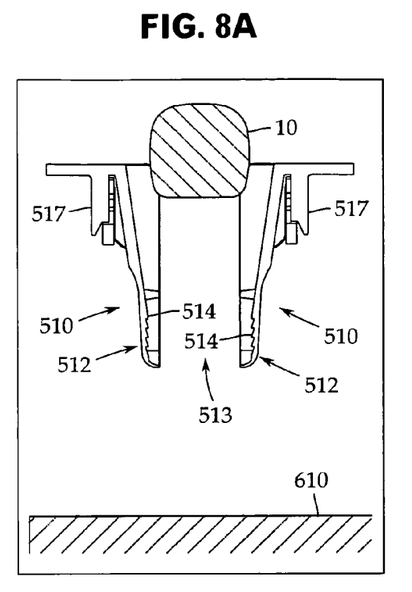
FIGS. 8A to 8D are schematic diagrams showing a series of motions of the holding arms.
Figure 8B:
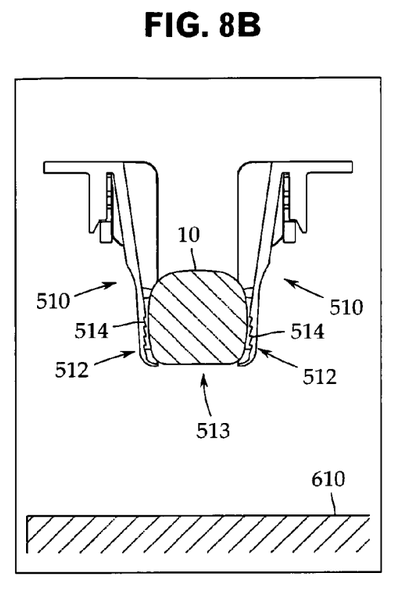

As shown in FIG. 8A, the rice ball 10 thrown down at the conveyance section 500 falls down as it is in a stable posture on the guide surface 511 formed in a tapered shape between the holding arms 510, 510, and is caught in the housing space 513 formed by the claw portion 512 at the leading end, as shown in FIG. 8B.

Figure 11A:
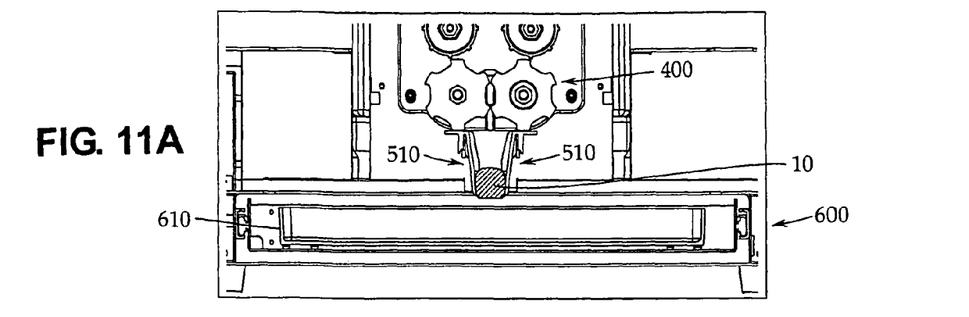
FIGS. 11A to 11D are schematic diagrams showing the movement of the conveyance section in the X-axis direction.
Figure 11B:
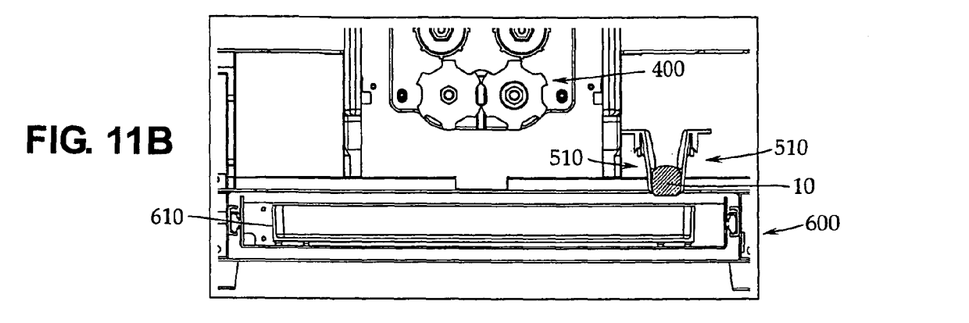

After ascertaining that the rice ball 10 has been caught by the holding arm 510, the control section first issues an instruction to the X-axis moving means 570. As shown in FIGS. 11A and 11B, the X-axis moving means 570 which has received the instruction moves the driving belt 573 via the drive motor and causes the whole housing cover 501 including the holding arm 510 to move to a prescribed X-axis position of the tray 610.

Figures 9A, 9B, 9C, 9D:
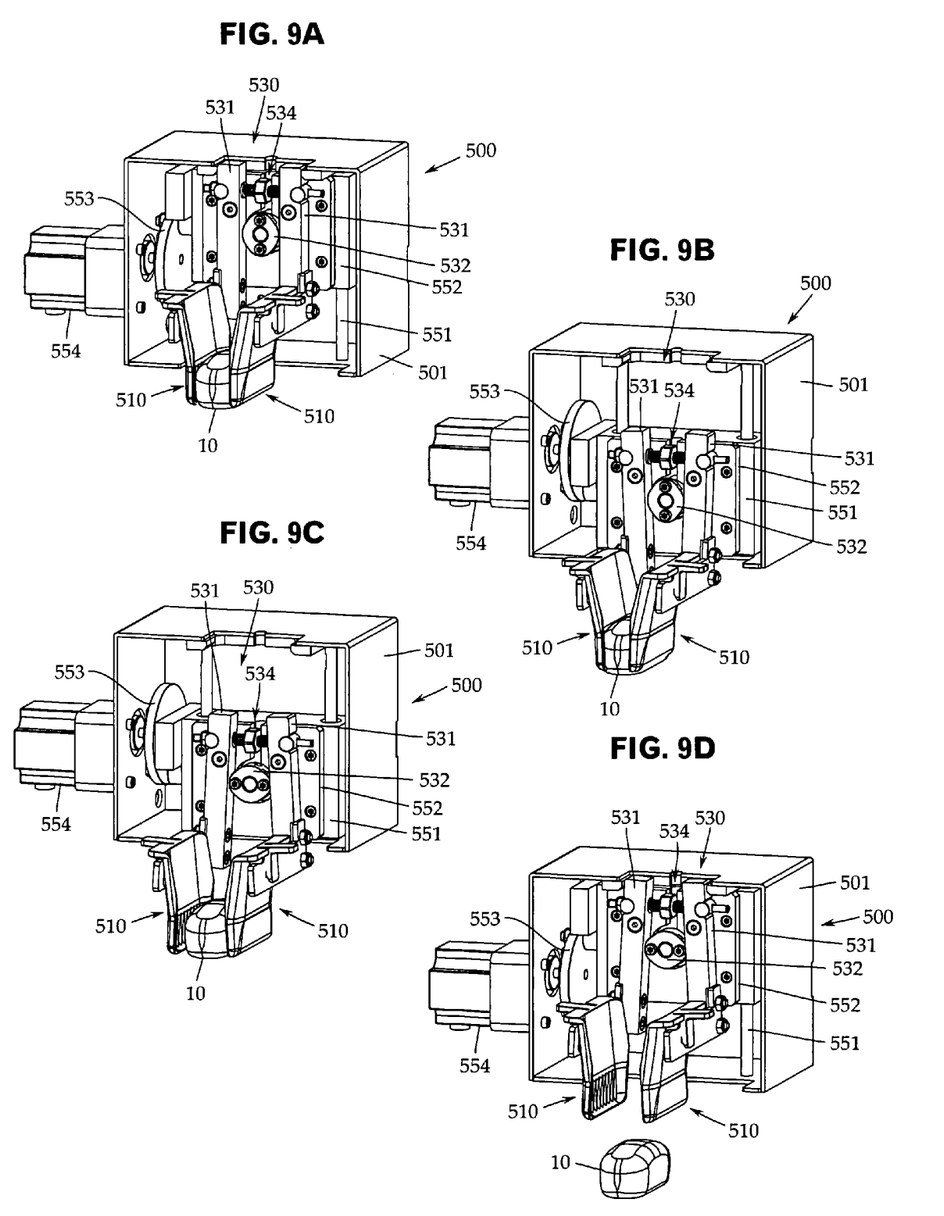
FIGS. 9A to 9D are schematic diagrams showing the movement of a driving system related to a series of motions of the holding arms.

After causing the housing cover 501 to move to a prescribed X-axis position, the control section next issues a descent instruction to the Z-axis moving means 550. After receiving the descent instruction, as shown in FIGS. 9A and 9B, the Z-axis moving means 550 causes the cam 553 to rotate via the drive motor 554 and causes the Z-axis slide base 552 to slide downward. As a result of this, the holding arm 510 descends.

Figure 8C:
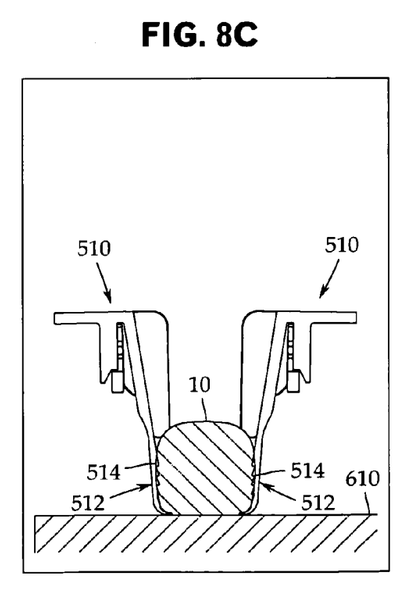
Figure 8D:
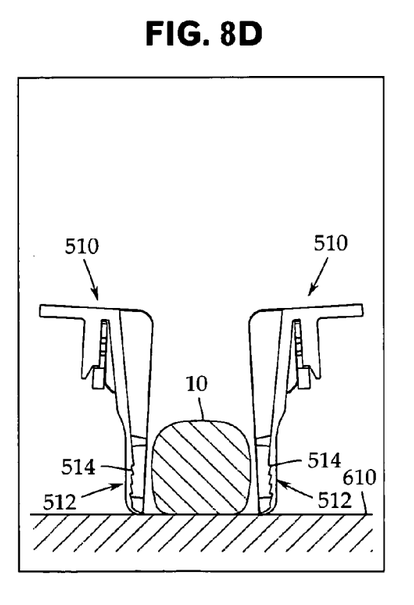

As shown in FIGS. 8C and 8D, as the Z-axis moving means 550 descends, the control section issues an "ARM-CLOSE" instruction to the arm opening and closing means 530. The arm opening and closing means 530 closes a little the leading end of the holding arm 510 and firmly grasps the rice ball 10.

The bottom surface of the rice ball 10 firmly held by the holding arm 510 is pressed against the tray 610 as the Z-axis moving means 550 descends, and the bottom surface of the rice ball 10 is deformed to be flat by the tray 610. On that occasion, the rice ball 10 is more firmly held by the displacement prevention means 514 and is positively prevented from lifting up by being pressed.

As shown in FIGS. 10A to 10D, the depressing lever 591 provided on the front surface side (the left side surface in FIG. 10) of the holding arm 510 rotates as a result of a decent action of the holding arm 510, and the depressing surface 592 at the leading end depresses the upper surface of the rice ball 10, thereby positively removing the rice ball 10 from the holding arm 510.

After ascertaining that the Z-axis moving means 550 has descended completely, the control section issues an "ARM-OPEN" instruction to the arm opening and closing means 530. In response to this instruction, the arm opening and closing means 530 causes the disk cam 532 to rotate, as shown in FIGS. 9C and 9D, and pushes up the inner circumferential surfaces of the link arms 531, 531 with the side surface on the long axis side, with the result that the link arms 531, 531 rotate around rotary shafts and that the leading end of the holding arm 510 opens. Incidentally, even during the opening action of the holding arm 510, the depressing lever 591 continues pushing up the rice ball 10.

After the holding arm 510 opens completely, the control section issues an "INITIAL POSITION" instruction to the Z-axis moving means 550 and the Z-axis moving means 550 lifts up the holding arm 510 to an initial position. As a result of this, also the depressing lever 591 returns to an initial position.

Figure 10A:
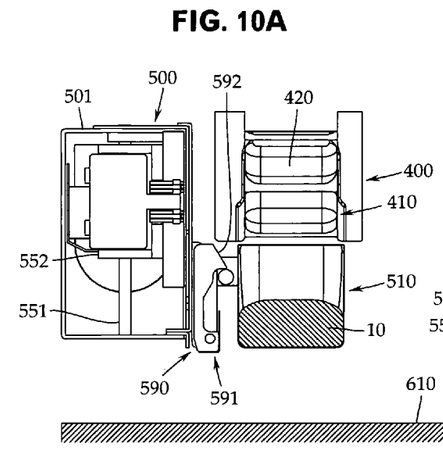
FIGS. 10A to 10D are schematic diagrams showing a series of motions of the conveyance section as viewed from the side surface.
Figure 10B:
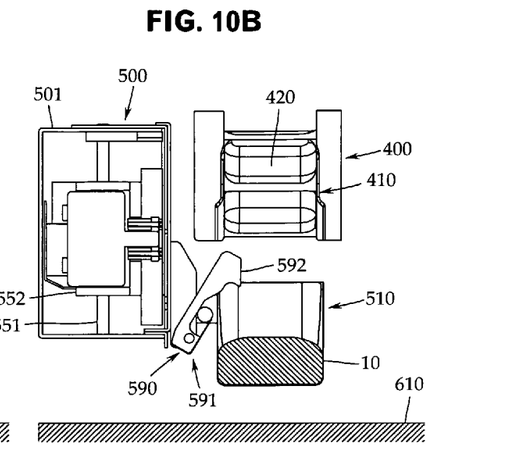
Figure 10C:
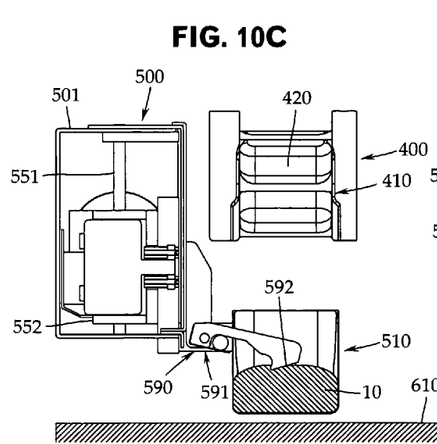
Figure 10D:
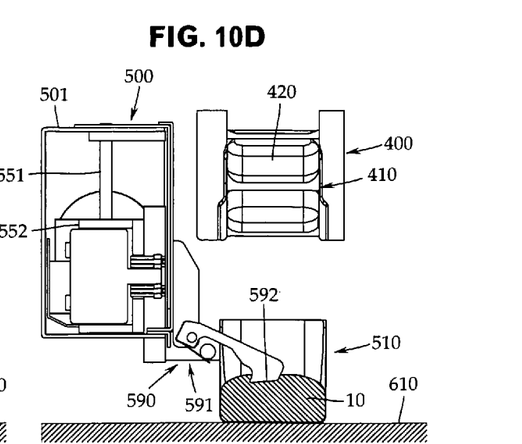

Furthermore, the control section issues an "ARM-MEDIUM POSITION" instruction to the arm opening and closing means 530. In response to this instruction, the arm opening and closing means 530 closes the leading end and returns the holding arm 510 to a medium position (FIG. 10A). After that, the control means issues an "INITIAL POSITION" instruction to the X-axis moving means 530 and returns the housing 501 of the conveyance section 500 to an initial position. Incidentally, the positioning of the above-described initial position and middle position may be mechanically performed by using striking means and the like or may be electrically performed by using a control program, a sensor and the like.

Figure 11C:
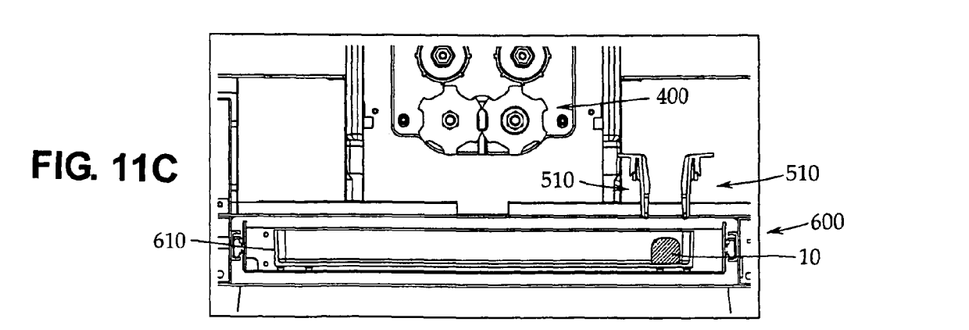
Figure 11D:
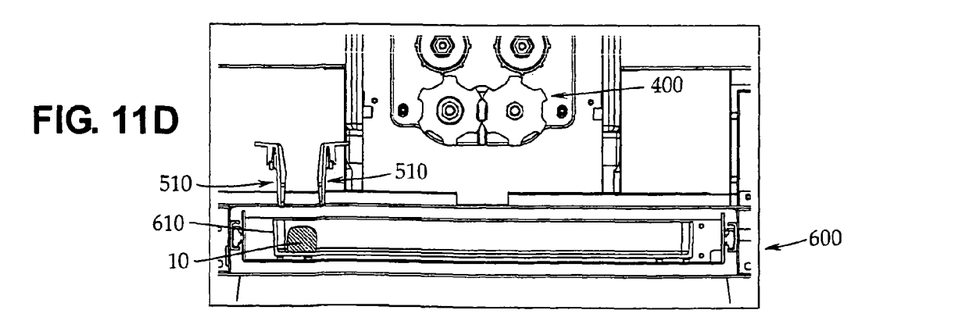

For the conveyance section 500 which has again returned to an initial position, the control section repeats the above-described series of conveyance actions. On that occasion, the control section places the next rice ball 10 to a place opposite to the previous rice ball 10. That is, when the previous rice ball 10 is placed at the right end of the tray 610 as shown in FIG. 11C, the next rice ball 10 is placed at the left end of the tray 610 as shown in FIG. 11D.

According to this method, it is possible to prevent an intact rice ball 10 from collapsing if the holding arm 510 comes into contact with the adjacent rice ball 10 in the event of a catch mistake and an error. Furthermore, it is possible to spread rice balls 10 over the tray 610 by efficiently using the volume of the tray 610.

When rice balls 10 have been spread over the tray 610 in the X-axis direction thereof by performing the above-described conveyance in sequence, the control section issues a "SLIDE" instruction to the Y-axis moving means 600. In response to this instruction, the Y-axis moving means 630 advances the stage 640 exactly a specified distance via the drive motor.

On ascertaining that rice balls 10 have been spread over the tray 610 in a specified quantity by repeating the above-described series of steps, the control section causes the tray 610 to move to a takeout position via the Y-axis moving means 600. After that, the control section returns the conveyance section 500 to an initial position and finally informs the worker that the forming work has been completed by using a buzzer or the like.

In the above-described embodiment, the case where the cooked rice molding apparatus 100 forms the rice ball 10 as a formed cooked rice product was taken as an example. However, the cooked rice molding apparatus 100 of the present invention may be applied to formed cooked rice products other than the rice ball 10 so long as the cooked rice molding apparatus 100 has the above-described features. Furthermore, the cooked rice molding apparatus of the present invention may also be applied to molding apparatus of various kinds of formed food products, such as croquettes and cookies.

The invention claimed is:

1. A cooked rice molding apparatus, comprising:
   a housing;
   a hopper present on the housing;
   a forming section present in the housing, comprising
      a pair of forming rollers which forms cooked rice, which is supplied from the hopper, into a prescribed formed cooked rice product, and;
   a storage section present in the housing, which stores the formed cooked rice product; and
   a conveyance section, provided with a pair of holding arms which holds the formed cooked rice product in a sandwiching manner, present between the forming section and the storage section which conveys the formed cooked rice product formed by the forming section to the storage section,
   wherein the conveyance section comprises an X-axis moving device which moves the pair of holding arms in an X-axis direction within the housing and a Z-axis moving device which moves the pair of holding arms in a Z-axis direction within the housing,
   the storage section comprises a tray for storing the formed cooked rice product conveyed by the pair of holding arms thereon and capable of moving in a Y-axis direction within the housing and a Y-axis moving device moving the tray,
   the X-axis direction is a width direction of the housing,
   the Z-axis direction is a vertical direction of the housing which is orthogonal to the X-axis direction,
   the Y-axis direction is a depth direction of the housing which is orthogonal to the X-axis direction,
   the forming section, the conveyance section, and the storage section are disposed in the housing in a vertical direction in an order from a top toward a bottom of the housing,
   the pair of holding arms moves the formed cooked rice product in the X-axis direction with the X-axis moving device from an initial position where the formed cooked rice product is released and dropped from the forming section, and
   the tray is movable in the Y-axis direction within an area in which the pair of holding arms moves in the X-axis direction.

2. The cooked rice molding apparatus according to claim 1, wherein the pair of forming rollers rotates in directions opposite to each other around a prescribed horizontal rotary axis,
   at least one concave molding surface for forming the formed cooked rice product is provided on an outer circumferential surface of each of the forming rollers,
   the cooked rice fed from an upstream side of opposed surfaces of each of the forming rollers is formed with the concave molding surfaces and is discharged from a downstream side of the opposed surfaces of the forming rollers, and
   each of the holding arms is formed in a shape of a letter V such that a distance between the holding arms decreases from an upper end side to a lower end side in order to catch the formed cooked rice product falling from a downstream side of the forming section.

3. The cooked rice molding apparatus according to claim 2, wherein a claw portion, which holds the formed cooked rice product from a bottom surface thereof to a side surface thereof, is provided on an opening and closing end side of each of the holding arms and the claw portions are arranged to be opposed to each other so that a space, in which the formed cooked rice product is housed, is formed between the claw portions.

4. The cooked rice molding apparatus according to claim 3, wherein a surface of the claw portion opposed to the formed cooked rice product is provided with a displacement prevention part for preventing the formed cooked rice product from shifting upward due to a pressing force during pressing of the formed cooked rice product against the tray.

5. The cooked rice molding apparatus according to claim 4, wherein the displacement prevention part is formed in a shape of saw teeth having a gentle obtuse surface in a falling direction of the formed cooked rice product and an acute surface in a counter falling direction of the formed cooked rice product.

6. The cooked rice molding apparatus according to claim 2, wherein the conveyance section further comprises an arm opening and closing part which releases the formed cooked rice product held by the holding arms in the sandwiching manner by opening and closing a leading end of each of the holding arms, and a pushing-out part which pushes out the formed cooked rice product housed in the holding arm to the storage section.

7. The cooked rice molding apparatus according to claim 6, wherein the pushing-out part includes a depressing lever which maintains a posture of the formed cooked rice product by depressing an upper surface of the formed cooked rice product during release of the formed cooked rice product, and
   the depressing lever is provided with a spring part which makes a depressing force of the formed cooked rice product constant.

8. A cooked rice molding apparatus, comprising:
   a housing;
   a hopper present on the housing;

a forming section present in the housing which forms cooked rice, which is supplied from the hopper into the housing, into a prescribed formed cooked rice product, and having a pair of forming rollers which rotates in directions opposite to each other around a prescribed horizontal rotary axis;

a storage section present in the housing, which stores the formed cooked rice product; and a conveyance section present between the forming section and the storage section which conveys the formed cooked rice product formed by the forming section to the storage section, wherein the conveyance section comprises
- an X-axis moving device which moves the formed cooked rice product in an X-axis direction within the housing,
- a Z-axis moving device which moves the formed cooked rice product in a Z-axis direction within the housing,
- a pair of holding arms which holds the formed cooked rice product in a sandwiching manner, each of the holding arms is formed in a shape of a letter V such that a distance between the holding arms decreases from an upper end side to a lower end side in order to catch the formed cooked rice product falling from a downstream side of the forming section, and
- a housing cover and a depressing part having a depressing lever, the depressing part is formed between the holding arms, the Z-axis moving device has a slide base in the housing cover connected with the depressing part, a free end of the depressing lever rotates in association with ascent and descent of the slide base, the storage section comprises a tray for storing the formed cooked rice product conveyed by the conveyance section thereon and capable of moving in a Y-axis direction within the housing and a Y-axis moving device moving the tray, the X-axis direction is a width direction of the housing, the Z-axis direction is a vertical direction of the housing, the Y-axis direction is a depth direction of the housing, the forming section, the conveyance section, and the storage section are disposed in the housing in a vertical direction in an order from a top toward a bottom of the housing, the conveyance section moves the formed cooked rice product in the X-axis direction with the X-axis moving device from an initial position where the formed cooked rice product is released and dropped from the forming section, the tray is movable in the Y-axis direction within an area in which the conveyance section moves in the X-axis direction, at least one concave molding surface for forming the formed cooked rice product is provided on an outer circumferential surface of each of the forming rollers, and the cooked rice fed from an upstream side of opposed surfaces of each of the forming rollers is formed with the concave molding surfaces and is discharged from a downstream side of the opposed surfaces of the forming rollers.

9. The cooked rice molding apparatus according to claim 8, wherein the depressing lever has a depressing surface at the free end thereof depressing an upper surface of the formed cooked rice product.

10. The cooked rice molding apparatus according to claim 9, wherein the housing cover has a supporting stay on a front surface thereof such that the depressing lever is rotatable around a rotary shaft disposed on the supporting stay, and
the depressing lever has a plate spring at a lower end side thereof making depressing force with which the depressing lever depresses the upper surface of the formed cooked rice product at the depressing surface.

11. The cooked rice molding apparatus according to claim 10, wherein the plate spring is a metal plate present along a front surface of the depressing lever, and
the depressing force applied to the depressing surface becomes constant by hitching of a part of a guide rib.

* * * * *